United States Patent [19]

Hayashi et al.

[11] 4,341,729
[45] Jul. 27, 1982

[54] METHOD AND APPARATUS FOR MAKING BIAXIALLY STRETCHED TUBULAR FILMS

[75] Inventors: Kohtaro Hayashi, Chibaken; Ko Morihara, Chibashi; Kohji Nakamura, Chibaken, all of Japan

[73] Assignee: Chisso Corporation, Tokyo, Japan

[21] Appl. No.: 105,220

[22] Filed: Dec. 19, 1979

[30] Foreign Application Priority Data

Dec. 25, 1978 [JP] Japan .................................. 53-159456

[51] Int. Cl.$^3$ .............................................. B29D 7/24
[52] U.S. Cl. ....................................... 264/566; 264/37; 264/567; 264/568; 264/569; 264/289.3; 425/74; 425/326.1; 425/384; 425/388; 425/445
[58] Field of Search .................. 425/388, 326.1, 72 R, 425/384, 73–74, 445; 264/566, 567, 289.2, 37, 568, 569

[56] References Cited

U.S. PATENT DOCUMENTS

| | | | |
|---|---|---|---|
| 3,325,575 | 6/1967 | Last | 264/290.2 |
| 3,363,035 | 1/1968 | Niiho et al. | 425/388 |
| 3,456,044 | 7/1969 | Pahlke | 425/326.1 |
| 3,555,603 | 1/1971 | Haley | 425/72 R |
| 3,904,342 | 9/1975 | Sato et al. | 264/567 |
| 3,985,849 | 10/1976 | Notomi et al. | 264/567 |

Primary Examiner—Jeffery R. Thurlow
Attorney, Agent, or Firm—Fred Philpitt

[57] ABSTRACT

An apparatus for making biaxially stretched tubular films of thermoplastic synthetic resin which permits operation in a stabilized manner and economically by using the hot air used in stretching a bubble again in heating a raw film. In said apparatus, a suction ring is provided in the section where a heated raw film is inflated by the gas filled therein under pressure, and the diameter of the resulting stretched bubble reaches its maximum diameter. The suction ring sucks the air used for heating the stretching part simultaneously with the air used for cooling it after stretching to attain a thermal interception effect between the stretching part and the cooling part after stretching. Air flow around the stretching bubble is made uniform.

4 Claims, 2 Drawing Figures

FIG. I
PRIOR ART
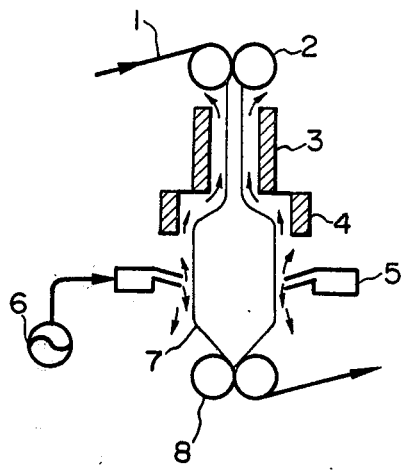
FIG. 2
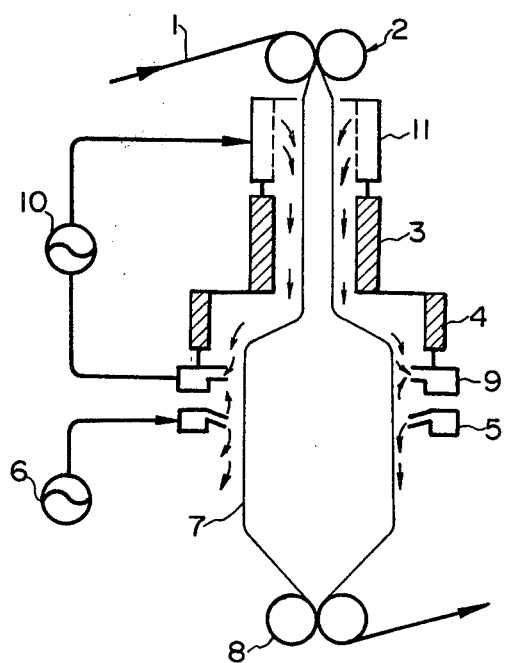

METHOD AND APPARATUS FOR MAKING BIAXIALLY STRETCHED TUBULAR FILMS

BACKGROUND OF THE INVENTION

1. Field of the Invention:

This invention relates to an apparatus for making biaxially stretched tubular films of thermoplastic synthetic resin in a stabilized manner and by using a heat source effectively.

2. Description of the Prior Art:

As for an apparatus for making biaxially stretched tubular films of thermoplastic synthetic resin, there is generally known a process in which an unstretched raw film delivered by pinch rolls is heated up to a stretching temperature by way of various methods, filling a gas having a pressure sufficient to inflate said raw film sealingly, into the inside thereof and taking up said film with stretching pinch rolls having a circumferential speed faster than that of delivery pinch rolls.

As for heating apparatus for a raw film, an infrared radiation system or a hot air circulation system, and as for cooling after stretching, a water cooling system and an air cooling system have been known.

In a stretching apparatus which depends on the inside pressure of a bubble, when an unstretched raw film is heated and reaches a high temperature, its tensile strength decreases and it starts inflation in a circumferential direction by the pressure of gas within the bubble, and at this point, if the temperature is suitable to stretching, the film is stretched and increases its tensile strength and inflation stops at a point where the tensile strength has exceeded the expansion power caused by the inside pressure of the bubble. It has been also known that there is a process in which inflation is regulated by elevating the tensile strength by way of the forced cooling of an inflating bubble. In carrying out biaxial stretching by using these apparatuses in a stabilized manner, uniform heating of a raw film, the uniformity of temperature at the stretching part and the uniformity of temperature at the stretching-terminating part are indispensable. According to conventional apparatuses, even if the uniform heating of a raw film and the uniformity of temperature at the stretching part are maintained, there are drawbacks in that the uniformity of temperature at the stretching-terminating part and the stability of ambient atmosphere cannot be controlled, and the quality and the form of a bubble are unstable by the influence of temperature variation and flow variation of air inside a room where said apparatus is operated.

SUMMARY OF THE INVENTION

According to the apparatus for biaxially stretching tubular films according to the present invention (which will be referred to as the apparatus of the present invention), the above-mentioned drawbacks are completely overcome, stabilized stretching state can be attained and simultaneously, thermal efficiency at the above-mentioned heating part is also elevated. Namely, in the apparatus of the present invention, after a raw film is heated and inflated by the inside pressure of a bubble, and before it is taken up in the next step of cooling apparatus, a definite suction apparatus is provided to force heating air to flow quantitatively along the bubble and also suck cooling air from the side of the cooling apparatus, whereby the respective terminal points of the air flows in the heating part and in the cooling part are sharply delineated by an annular separation line. By this suction apparatus, it is possible to extremely stabilize the stretching bubble of biaxially stretched tubular films which bubble has been so far unstable due to the disturbing influence such as variation of air flow within a room, variation of temperature, etc., and thereby to produce good stretched film having less variation of folded width and less variation of thickness. Further, since sucked high temperature air can be utilized again as a source for preheating a raw film, it is possible to increase heating efficiency and reduce the production cost.

BRIEF DESCRIPTION OF THE DRAWING

An apparatus of the present invention will be explained fully referring to the accompanying drawings. In the drawings, FIG. 1 shows schematically a vertical cross-section of a conventional apparatus for making biaxially stretched tubular films with radiation heating, an inside pressure enclosing and air-cooling type and FIG. 2 shows an apparatus of FIG. 1 to which the apparatus of the present invention is added.

PREFERRED EMBODIMENT OF THE INVENTION

Unstretched raw film 1 is delivered by delivery pinch rolls 2 revolving at a definite circumferential speed into the inside of a heating furnace, and after being heated to a temperature suitable for stretching with heaters 3 and 4, it is stretched in the longitudinal direction by stretching pinch rolls 8 revolving at a circumferential speed several times faster than that of delivery pinch rolls 2, while it is inflated in the circumferential direction by the pressure of gas enclosed in the inside. The raw film after completion of inflation, i.e. bubble 7, is cooled to a temperature of about room temperature by cold air discharged from cooling air rings 5 and a cooling blower 6 in order to prevent an excessive inflation. The flow of air inside the heating furnace and the cooling air in this apparatus are caused by reflection flow of cooling air and draft inside the heating furnace as shown by arrow marks, and the air inside the heating furnace ascends in an unstable state without being regulated. On this account, the amount and temperature of ascending air inside the furnace is liable to be susceptible to the influence by the variation of room temperature of the atmosphere surrounding the stretching apparatus, the variations of direction of air flow and velociy and the variations of temperature and quantity of cooling air. Thus, uniform heating and uniform cooling which are necessary to stabilize the bubble 7 cannot be maintained. Further if the blow outlet of the cooling air ring 5 is turned further downward, since high temperature air inside the heating furnace is involved, the boundary of the sections of the heating part and the cooling part are not only unclear, but also the cooling effect itself is reduced. These phenomena have exerted a bad influence directly upon the variations of folded width and thickness, and thus made the production of satisfactory products difficult.

In contrast, FIG. 2 shows a heating and cooling system of the apparatus for making biaxially stretched films of inside-pressure-enclosing type according to the present invention. Suction ring 9 for hot air sucks both high temperature air above it and reflected flow from the cooling air ring 5, and if the air amounts of a suction fan 10 and a cooling blower 6 are maintained at constant volumes, the separation line between the hot air zone and the cooling air zone will not shift, but is instead fixed in a constant position. Further, by discharging a part or the whole of the suctioned hot air into a preheating pipe 11, there can be attained a hot air circulating system in which the influence of outside disturbance due to the variation of an atmospheric temperature or a variation of flow is almost negligible, resulting in a bubble 7 having an extremely stabilized state. As a result, it has become possible to obtain excellent biaxially stretched films having less variations in folded width and thickness, and at the same time, to obtain a collectively perfect apparatus, because hot gas which has previously been allowed to cause convection into a room without order can be utilized for preheating, which has improved the heat efficiency of the heating units 3 and 4 of the apparatus of the present invention. In addition, the present invention can be employed in a wide range irrespective of kinds of heating system and cooling system such as radiation heating, hot gas heating, etc.

The apparatus of the present invention will be described more fully by way of a non-limitative specific Example and a Comparative example.

SPECIFIC EXAMPLE AND COMPARATIVE EXAMPLE

Biaxially stretched films of polypropylene were made under the following conditions (1) and the results of (2) were obtained:

(1) Conditions

| | |
|---|---|
| Raw material used: | polypropylene |
| Diameter of a raw film: | 60 mmφ |
| Diameter of bubble: | 600 mmφ |
| Thickness of film: | 20μ |
| Stretching ratio: | 6 times in length |
| | 6 times in width |
| Stretching speed: | 40 m/min |
| Inside diameter of suction ring: | 700 mmφ (This ring was not used in the Comparative example.) |
| Distance from the upper end of suction ring to the terminating point of stretching of bubble: | 80 mm |
| Distance from the upper end of suction ring to the upper end of cooling ring: | 100 mm |
| Inside diameter of cooling ring: | 700 mmφ |
| Suction fan: | 6 m³/min, −200 mm aq. (This fan was not installed in the Comparative example.) |
| Cooling blower: | 5 m³/min, 200 mm aq. |
| Heating manner of raw film: | hot gas 180° C. (170° C. in case of preheating) |
| Room temperature: | 25° C. |

(2) RESULTS

Compared with a case of Comparative example in which the apparatus of the present invention was not used, the following advantages have been obtained according to the results of the specific Example in which the apparatus of the present invention was used.

(a) Deviation of inflation of bubble and swing in the longitudinal and transversal directions become less and the stability of stretching becomes extremely good. As a result, there were the following improvements in:
Unevenness of flat width of film: ±9 mm→±2 mm
Deviation of thickness of film: ±20-25%→±10-5%

(b) By preheating raw film with sucked hot air, operation becomes possible at a temperature of hot gas for heating raw film of 170° C. which was lower than 180° C. This resulted in economy of electric power.

(c) Since 100% of cooling air became room air and its temperature became also room temperature of 25° C., cooling effect has been elevated. Sagging of flattened film at the middle part thereof, which has been a fatal drawback of tubular stretching that the length of middle part becomes longer than those of both the ends in the difference of the length of films between both the ends and the middle part in the longitudinal direction.

This difference was 5 mm/m but an improvement of reducing it to 2 mm/m was obtained.

What is claimed is:

1. In an apparatus for making biaxially stretched thermoplastic synthetic resin, which comprises pinch rolls for the delivery of a tubular resin film, stretching pinch rolls to take up the resin film, means to inflate said tubular film with pressurized gas to form a bubble having a maximum diameter and heating means intermediate said delivery and stretching rolls that is adapted to apply heat to said resin film, the improvement which comprises (a) cooling means located downstream of said heating means and adapted to apply a stream of cooling gas against the maximum diameter portion of said bubble, (b) a suction ring extending annularly around the maximum diameter portion of said bubble at a point intermediate said heating means and said cooling means, the plane of said suction ring being perpendicular to the line extending between said pinch rolls, and (c) a suction fan connected to said suction ring which is adapted to suck gas through said suction ring, whereby gas flow around the stretching bubble is made uniform and at least a portion of the hot gases caused by said heating means and at least a portion of the cooling gases generated by said cooling means are simultaneously sucked into said suction ring in an annular zone surrounding the bubble to thereby establish a sharply delineated annular separation line between the portion of the bubble that is being heated and the portion of the bubble that is being cooled.

2. In an apparatus for making biaxially stretched thermoplastic synthetic resin, which apparatus comprises pinch rolls for the delivery of a tubular resin film, stretching pinch rolls to take up the resin film, means to inflate said tubular film with pressurized gas to form a bubble having a maximum diameter and heating means intermediate said delivery and stretching rolls that is adapted to apply heat to said resin film, the improvement which comprises (a) cooling means located downstream of said heating means and adapted to apply a stream of cooling gas against the maximum diameter portion of said bubble, (b) a suction ring extending annularly around the maximum diameter portion of said bubble at a point intermediate said heating means and said cooling means, the plane of said suction ring being perpendicular to the line extending between said pinch rolls, (c) a suction fan connected to said suction ring which is adapted to suck gas through said suction ring, and (d) a preheating means located upstream of said heating means which is connected with said suction fan and adapted to blow the gases withdrawn through said suction ring against the exterior of said resin film before the resin film is subjected to said heating means, whereby air flow around the stretching bubble is made uniform and at least a portion of the gases generated by said heating means and at least a portion of the cooling gases generated by said cooling means are simultaneously sucked into said suction ring in an annular zone surrounding the bubble to thereby establish a sharply delineated annular separation line between the portion of the bubble that is being heated and the portion of the bubble that is being cooled.

3. An apparatus according to claim 1 or claim 2 wherein the distance between said suction ring and of said cooling means is about 100 mm.

4. In a method for making biaxially stretched thermoplastic synthetic resin by longitudinally stretching a tubular resin film between two spaced apart points and at the same time inflating said tubular film with pressurized gas to form a bubble having a maximum diameter, the improvement which comprises (a) heating said tubular film in advance of the point where it expands into a bubble having maximum diameter, (b) applying a stream of cooling gases against the exterior of said bubble at a location downstream of the point where the bubble first reaches its maximum diameter, (c) applying a suction force at a point intermediate the locations where the film is heated and then cooled in accordance with (a) and (b), so that both at least a portion of the hot gases caused by said heating means and at least a portion of the cooling gases generated by the cooling means are simultaneously sucked away from the exterior of the surface of the bubble, whereby the gas flow around the exterior of the film is made uniform and a sharply delineated annular separation line is established between the stretching portion of the bubble and the cooling portion of the bubble.

* * * * *